Oct. 27, 1959   V. CONDELLO ET AL   2,910,266
POPPET-BUTTERFLY VALVE
Filed June 12, 1957   2 Sheets-Sheet 1

INVENTORS
VINCENT CONDELLO
ROGER F. WHITE
BY William R. Wright, Jr.
AGENT

Oct. 27, 1959   V. CONDELLO ET AL   2,910,266
POPPET-BUTTERFLY VALVE
Filed June 12, 1957   2 Sheets-Sheet 2

INVENTORS
VINCENT CONDELLO
ROGER F. WHITE
BY
William R. Wright, Jr.
AGENT

2,910,266
POPPET-BUTTERFLY VALVE

Vincent Condello, Teaneck, and Roger F. White, Rutherford, N.J., assignors, by mesne assignments, to Thiokol Chemical Corporation, a corporation of Delaware Application June 12, 1957, Serial No. 665,281

7 Claims. (Cl. 251—25)

The present invention relates to a hybrid type valve embodying characteristics and corresponding advantages of both the poppet and the butterfly valve. Such valves are characterized generally by a two-stage opening movement, which commences with an axial unseating movement of the poppet valve and ends with the characteristic swinging or rotating movement of the butterfly valve.

The principal object of the present invention is to provide an improved poppet-butterfly valve.

A more specific object is to provide a novel self-seating valve in which fluid pressure in the conduit assists in seating the valve.

A further object is to provide a full "floating" poppet valve. Such object is realized by constructing a bellows type of support for the valve which allows a universal adjustment to the configuration of the valve seat.

Another object of the invention is to provide a valve structure of the type described in which pneumatic pressure is utilized to effect unseating and rotation, and in which control mechanism is provided to bring about automatic sequencing of these operations in both opening and closing actions.

A still further object is to provide operating mechanism for a poppet-butterfly valve in which the rate of operation may be readily adjusted.

A more specific object is to provide a valve structure in which the butterfly shaft is located entirely on the upstream side of the valve and thereby eliminates the necessity for intricate seals to prevent leakage around the shaft to the downstream side of the valve.

In carrying out the objects of the invention, a structure is provided in which a shaft or axle is extended across a conduit and constitutes the sole support of the valve. The shaft carries a pair of disks between which is sandwiched the valve proper, which is spring-urged toward one disk in a downstream direction and into closed position. Between the valve and the downstream disk is a pair of circular bellows forming an annular chamber and also serving as a flexible, universal mounting for the valve whereby it can shift axially and laterally to accommodate itself to the valve seat. Through a bore in the axle, air under pressure is introduced into the chamber, thereby forcing the valve to open position against the spring action. The axle extends into a housing where, through a rack and pinion connection, it connects with a piston in a pressure chamber. Air introduced into this chamber causes rotation of the axle and valve. A spring acting on the piston normally urges the axle into valve closing position, and is overcome by the air pressure.

In operation, air from a suitable pressure source is introduced freely into the poppet valve chamber to quickly shift the poppet axially, and at the same time bleeds into the piston chamber through an orifice, so that shifting of the valve is assured before rotation takes place.

Upon reversal of operation, as when supply pressure is disconnected or interrupted, pressure is vented from the piston chamber and venting of the poppet chamber is delayed until a predetermined point in the axle rotation to assure that the valve is rotated before it shifts axially to seated position.

Other objects of the invention will be pointed out in the following description and claims and illustrated in the accompanying drawings, which disclose, by way of example, the principle of the invention and the best mode, which has been contemplated, of applying that principle.

Figures 1, 4:
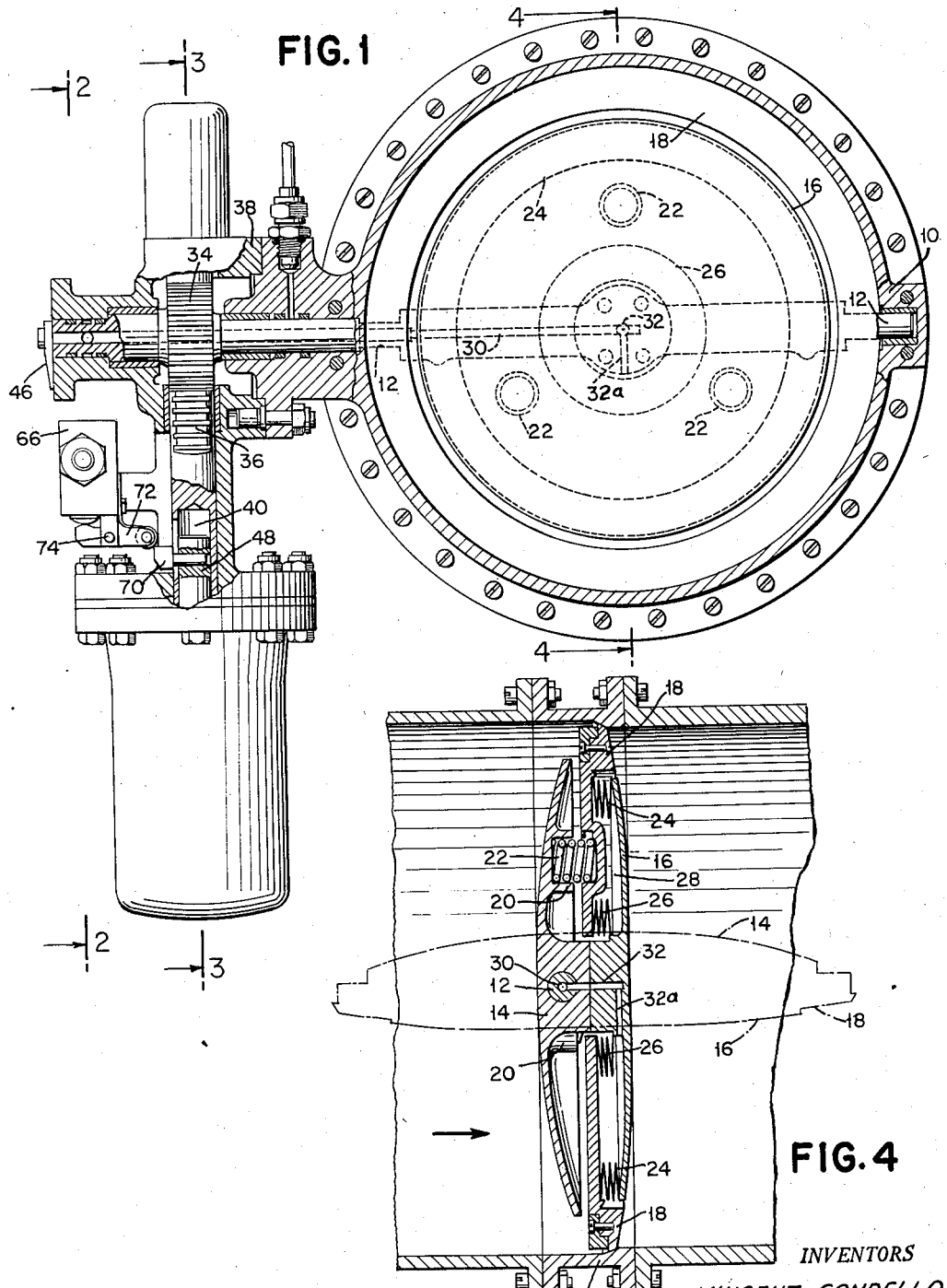
Figure 1 is a general view of the valve and control mechanism.
Figure 4 is a sectional view taken on lines 4—4 of Figure 1.

The apparatus comprises a main body member 10 having a circular opening therein within which there is supported a valve operating shaft 12 (Figure 1). The shaft is mounted for oscillation in suitable bearings and has fixedly secured thereto a disk-shaped carrier 14 which may be rotated through 90° to the dotted line position indicated in Figure 4.

Secured to carrier 14 is a second disk 16 and between the two there is a poppet valve 18 supported concentrically on carrier 16 by a pair of concentric bellows 24 and 26. Springs 22 normally urge valve 18 toward disk 16 to the position shown in Figure 4, wherein the conical seat of the valve engages body 10 to effect closure of the valve, with flow in the direction of the arrow serving to assist in maintaining the closed condition.

Intermediate valve 18 and disk 16 there is an outer bellows 24 and an inner bellows 26 forming a sealed, flexible chamber 28. The bellows furnish the sole support for valve 18, which is therefore rendered free-floating and can readily accommodate itself to its seat in body 10. The chamber has communication with a central axial bore 30 in shaft 12, through holes 32 and 32a drilled in disk 16 and carrier 14, as shown in Figure 4.

Air under pressure is directed through bore 30, holes 32a into chamber 28 where it causes expansion of bellows 24 and 26, and shifts valve 18 axially against springs 22. As a consequence, the valve becomes unseated sufficiently to provide the necessary clearance for rotational movement to the dotted line position of Figure 4.

Figure 3:
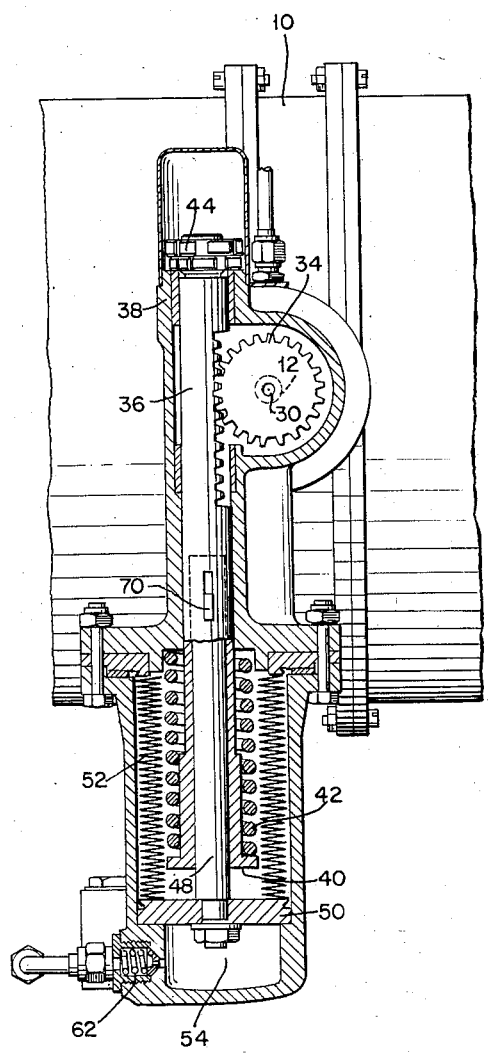
Figure 3 is a sectional view taken on lines 3—3 of Figure 1.

The mechanism for effecting rotational movement is shown in Figures 1 and 3, where shaft 12 has integral therewith a gear 34 meshing with a rack 36, guided for vertical movement in housing 38. The lower end of rack 36 terminates in a flanged tube 40 and by means of spring 42 extending between the flange and housing is normally biased downwardly. This in turn biases gear 34 and shaft 12 counterclockwise as viewed in Figures 3 and 4 to an extent permitted by the adjustable rack stop nut 44.

Figure 2:
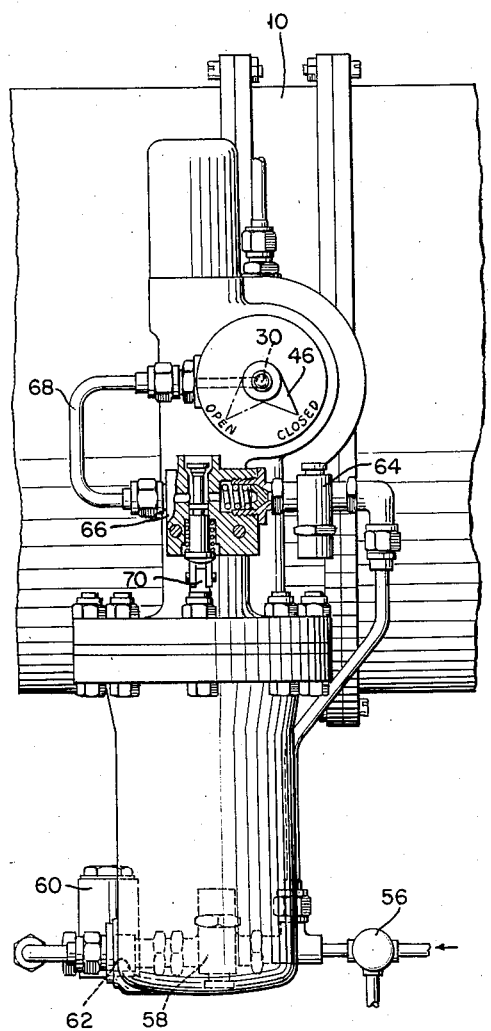
Figure 2 is an end view looking from the left in Figure 1.

An indicating finger 46, Figures 1 and 2, secured to the end of shaft 12 denotes the open or closed condition of the valve.

Within the tube 40 is a rod 48 having a disk 50 at its lower end and a sealing bellows 52 extends from disk 50, as shown in Figure 3, to form a pressure chamber 54. Pneumatic pressure exerted against disk 50 will first raise rod 48, compressing the bellows 52 and upon engaging flange 40 will elevate rack 36 and rotate gear 34 and shaft 12.

The control and timing of these several pneumatic operations is brought about in the following manner.

A three-way valve 56 (Figure 2) diagrammatically represented is positioned to direct pressure from a source (1000 p.s.i.), through pressure regulator 58 and relief valve 60 to an orifice check valve 62 (Figure 3) into chamber 54.

Simultaneously therewith, pressure is directed from valve 56 through pressure regulator 64 (Figure 2) and vent relief valve 66 to tube 68, and thence through bore 30 in shaft 12 to chamber 28 of the butterfly poppet valve (Figure 4).

The pressure is allowed free flow into the chamber 28 to effect a rapid pressure rise therein and thereby quickly shift poppet valve 18 away from its seat before shaft 12 can begin to rotate.

The pressure rate rise in chamber 54 is controlled by the bleed orifice 62 in order to obtain a delayed action and insure that the poppet valve 18 is fully retracted. This sequencing action is further assured by designing the poppet to act at a lower pressure than the main actuator in chamber 54.

As the pressure builds up in chamber 54, bellows 52 is compressed, disk 50 engages and elevates rack 36 with resultant rotation of the valve 18 to its fully open position.

To effect reclosure of the valve, the operation is as follows. Three-way valve 56 is turned to its position where it cuts off the operating pressure and connects the actuating chamber to atmosphere. Venting of the pressure from the main actuating chamber 54 allows the rack return spring 42 to restore the rack and rotate shaft 12 to restore the valve 18 ninety degrees to its vertical position. The reverse pressure flow from chamber 54 unseats the check valve 62 and thereby enables very rapid decay in the chamber.

During this rotational operation, the pneumatic pressure remains locked in the poppet valve chamber 28 due to the following reason. Rod 48 (Figures 1 and 3) has at its upper end a stop 70 extending through a slot in tube 40, which when the rod is elevated will engage and rock a lever 72 counterclockwise about pivot 74, enabling a plunger in vent valve 66 to lower and close the vent. The arrangement is such that lever 72 is held in such position until rod 48 again descends and allows clockwise return of the lever and consequent venting of chamber 28 through line 68 directly to atmosphere at valve 66.

As a result, springs 22 may now firmly seat the valve in fully closed position.

It is to be particularly noted that the above described structure provides a fail-safe operation. Loss of pneumatic actuation pressure for any reason will cause the valve to close under the action of the rack return spring and an unbalanced net pressure force on the valve assembly (with the valve partially open) which sets up a moment of force and results in movement about the butterfly shaft in the closing direction. The unbalanced torque force on the valve results from the fact that the valve assembly is rotated in an arc, due to the displacement of the center of rotation of the valve from the geometric center.

The rate of valve opening may be varied by either adjusting the actuating pneumatic pressure level or by adjusting the rate at which the pressure is introduced into the main actuation chamber 54. The rate of valve closing is a function of the spring rate of the rack return spring and the unbalanced pressure (torque) force on the valve.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

1. In a valve of the poppet-butterfly type, a valve seat, a valve axle mounted transverse to said seat, a valve element, means resiliently supporting said element on said axle for self-adjusting movement in a plane parallel to that of said seat, spring means carried by said axle for biasing said element against said seat, fluid pressure means for moving the valve element axially away from said seat against said biasing means, and means for rotating said axle and valve element after the unseating of the valve element.

2. A poppet-butterfly valve assembly comprising a valve seat, a valve axle, a pair of spaced disks integral with said axle, a valve element intermediate said disks, spring means between the element and one of said disks for biasing said element in one direction to valve seating position, a pressure chamber formed by the element and the other of said disks, means for introducing fluid into said chamber to overcome said spring biasing means and unseat the valve, and means for rotating the axle, disks and element after the valve has been unseated.

3. A poppet-butterfly valve assembly comprising a valve seat, a transverse axle on the upstream side of said seat, a valve element located in a plane between said seat and said axle, and resiliently supported by said axle, first fluid pressure means for moving the element in an upstream direction toward said axle to unseated position, second fluid pressure means for rotating the element about its axle, spring means biasing the element in a downstream direction to seated position, and control means including a restriction for delaying the supply of pressure fluid to said second fluid pressure means for first rendering said first pressure means effective and thereafter rendering the second pressure means effective to rotate said axle to cause unseating and rotation of said valve to occur in succession.

4. A poppet-butterfly valve structure comprising an operating axle, an upstream disk and a downstream disk spaced apart and integral with said axle, a valve element located between said disks, a pair of bellows between the element and the downstream disk forming an annular chamber therebetween and supporting said element for radial and axial relative movement therebetween, fluid pressure means in communication with the annular chamber for inflating the bellows, and means between the element and the upstream disk for exerting a constant pressure against the element in a direction away from said upstream disk.

5. The invention set forth in claim 4 in which said fluid pressure means comprises a duct in said axle extending therethrough for the introduction of fluid under pressure into said annular chamber to thereby force the element to overcome said constant pressure means and move the element toward said upstream disk.

6. In a poppet-butterfly valve mechanism having a valve seat, a first fluid pressure means for unseating the valve and a second fluid pressure means for rotating the valve transversely of said seat, a control device therefor comprising a source of operating pressure, means for connecting both said pressure means to said source, including means for restricting the pressure flow to the second means to cause unseating of the valve before rotation thereof, and including means effective upon disconnecting the pressure means from said source for restricting the release of the pressure flow from the first pressure means while freely venting the release of the pressure flow from the second pressure means to enable rotation of the valve before reseating thereof, and spring means effective upon release of the pressure flow for causing rotation and reseating of said valve.

7. A valve structure comprising a valve seat and a poppet-butterfly co-operating with said seat and having fluid pressure means for unseating said poppet-butterfly, fluid pressure means for rotating said poppet-butterfly transversely of said seat, control means including a restriction in said second mentioned fluid pressure means for applying fluid pressure to said first named means and thereafter to said means for rotating said poppet-butterfly thereby rotating said poppet-butterfly, means for reversely rotating said poppet-butterfly, and means effective at a predetermined point in said reverse rotation for venting the aforesaid fluid pressure, and means effective upon said venting to reseat said poppet-butterfly.

References Cited in the file of this patent

UNITED STATES PATENTS

| | | |
|---|---|---|
| 715,745 | Bickford | Dec. 16, 1902 |
| 1,780,562 | Melling | Nov. 4, 1930 |
| 2,238,814 | Kneass | Apr. 15, 1941 |
| 2,311,110 | Johnson | Feb. 16, 1943 |
| 2,326,686 | Rutledge | Aug. 10, 1943 |
| 2,612,338 | Flosdorf | Sept. 30, 1952 |
| 2,791,396 | Reppert | May 7, 1957 |